United States Patent [19]

Kakizaki

[11] Patent Number: 5,054,813
[45] Date of Patent: Oct. 8, 1991

[54] ROLLING SUPPRESSIVE CONTROL SYSTEM FOR AUTOMOTIVE SUSPENSION SYSTEM WITH ENHANCED RESPONSE CHARACTERISTICS

[75] Inventor: Shinobu Kakizaki, Kanagawa, Japan

[73] Assignee: Atsugi Unisia Corporation, Kanagawa, Japan

[21] Appl. No.: 454,962

[22] Filed: Dec. 22, 1989

[30] Foreign Application Priority Data

Dec. 26, 1988 [JP] Japan .......................... 63-168684[U]

[51] Int. Cl.$^5$ .............................................. B62D 9/02
[52] U.S. Cl. ..................................... 280/772; 280/689; 280/707
[58] Field of Search .................... 280/772, 689, 707

[56] References Cited

U.S. PATENT DOCUMENTS

| 4,564,214 | 1/1986 | Tokunaga et al. | 280/772 |
| 4,761,022 | 8/1988 | Ohashi et al. | 280/772 |
| 4,830,394 | 5/1989 | Tanaka et al. | 280/772 |
| 4,872,701 | 10/1989 | Akatsu et al. | 280/772 |

FOREIGN PATENT DOCUMENTS 3632920 3/1988 Fed. Rep. of Germany .
62-72811 9/1987 Japan .

*Primary Examiner*—Kenneth R. Rice
*Attorney, Agent, or Firm*—Ronald P. Kananen

[57] ABSTRACT

A suspension control system for an automotive vehicle employs a suspension system provided between a vehicle body and a suspension member rotatably supporting a road wheel, the suspension system incorporating means for varying suspension characteristics between at least a first mode with a softer suspension characteristic and a second mode with a harder suspension characteristic. A lateral acceleration sensor is provided for monitoring lateral acceleration exerted on the vehicle body to produce a lateral acceleration indicative signal. A control unit processes the lateral acceleration indicative signal in such a manner that the control unit detects initiation of vehicular rolling on the basis of the sum value for producing a first suspension control signal ordering the second mode and detects termination of vehicular rolling on the basis of magnitude of lateral acceleration for producing a second suspension control signal ordering the first mode.

8 Claims, 4 Drawing Sheets

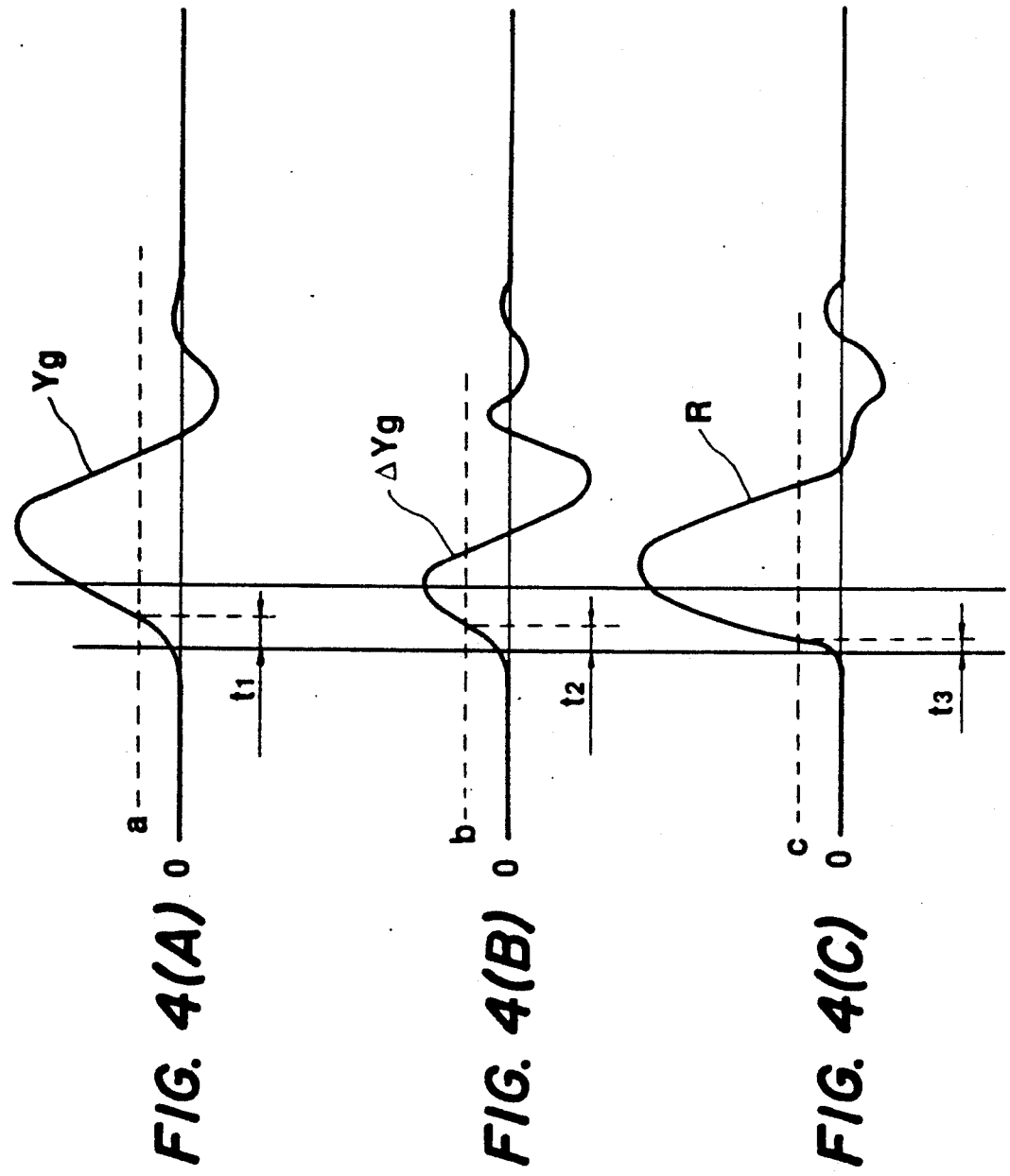

ROLLING SUPPRESSIVE CONTROL SYSTEM FOR AUTOMOTIVE SUSPENSION SYSTEM WITH ENHANCED RESPONSE CHARACTERISTICS

BACKGROUND OF THE INVENTION

1. Field of the Invention

The present invention relates generally to a suspension control system for an automotive vehicle. More specifically, the invention relates to a technology for suppressing vehicular rolling motion with enhanced responsive characteristics.

2. Description of the Background Art

Various suspension control systems have been proposed in order to achieve both vehicular riding comfort and driving stability. In such suspension control systems, suppression of vehicular rolling is one of the most important factors in measuring control performance. For example, Japanese Utility Model First (unexamined) Publication (Jikkai) Showa 62-72811 discloses a roll suppressive suspension control system. The above-identified prior proposed system employs a variation in a rate of lateral acceleration for detecting a vehicular rolling condition in a magnitude requiring a harder suspension.

As will be appreciated, in such rolling suppressive suspension control utilizing lateral acceleration exerted on the vehicular body, a vehicular rolling condition for hardening suspension characteristics can be detected only after a certain magnitude of vehicular rolling motion is actually caused. In view of this, it is preferred to detect the vehicular rolling state at a timing as early as possible. In this aspect, a variation in a rate of lateral acceleration may be advantageously introduced rather than a magnitude of its lateral acceleration because of higher response characteristics. Namely, at the beginning of vehicular rolling, a gradient of a variation of the variation rate of lateral acceleration is greater than that of lateral acceleration to make it easy to detect vehicular rolling. However, on the other hand, when the vehicle travels through a relatively long and constant radius curve, the variation rate becomes zero at the intermediate portion of the curved road due to a constant angular position of the vehicular steering. In such case, when the variation rate of the lateral acceleration is employed as the vehicular rolling condition detecting parameter, discrimination between the vehicular condition steadily traveling on a straight road and a curved road can not be made despite actual rolling caused on the vehicle. This results in a softening of the suspension characteristics despite exertion of the lateral acceleration in a significant magnitude to increase rolling magnitude.

SUMMARY OF THE INVENTION

In view of the drawbacks in the prior art, it is an object of the present invention to provide a technology of suspension control with satisfactorily high response characteristics. Another object of the present invention is to provide a rolling suppressive automotive suspension control system which assures driving stability with a high response.

In order to accomplish aforementioned and other objects, a suspension control system for an automotive vehicle comprises:

a suspension system provided between a vehicle body and a suspension member rotatably supporting a road wheel, the suspension system incorporating means for varying suspension characteristics at least between a first mode with a softer suspension characteristic and a second mode with a harder suspension characteristic;

a lateral acceleration sensor for monitoring lateral acceleration exerted on the vehicle body to produce a lateral acceleration indicative signal; and a control unit receiving the lateral acceleration indicative signal for deriving a variation rate of lateral acceleration on the basis thereof, deriving a sum value of the lateral acceleration and the variation rate of lateral acceleration, and comparing the sum value with a predetermined first threshold value for detecting the sum value when greater than or equal to the first threshold value in order to produce a suspension control signal for ordering the second mode of the suspension system.

In the preferred construction, the control unit compares the lateral acceleration indicative signal value with a predetermined threshold value while the suspension system is maintained in the second mode, for detecting a magnitude of lateral acceleration smaller than the second threshold for producing a suspension control signal ordering the first mode of the suspension system. In such case, the control unit produces the suspension control signal ordering the first mode after a predetermined period from detection of the magnitude of lateral acceleration smaller than the second threshold.

According to another aspect of the invention, a suspension control system for an automotive vehicle comprises:

a suspension system provided between a vehicle body and a suspension member rotatably supporting a road wheel, the suspension system incorporating means for varying suspension characteristics at least a first mode with a softer suspension characteristic and a second mode with a harder suspension characteristic;

a lateral acceleration sensor for monitoring lateral acceleration exerted on the vehicle body to produce a lateral acceleration indicative signal; and a control unit receiving the lateral acceleration indicative signal for deriving a variation rate of lateral acceleration on the basis thereof, and deriving a sum value of the lateral acceleration and the variation rate of lateral acceleration, the control unit detecting initiation of vehicular rolling on the basis of the sum value for producing a first suspension control signal ordering the second mode and detecting termination of vehicular rolling on the basis of magnitude of lateral acceleration for producing a second suspension control signal ordering the first mode.

In this case, control unit may produce the second suspension control signal after a predetermined period from detection of termination of vehicular rolling.

In the preferred process, the control unit compares the sum value with a first threshold for detecting initiation of vehicular rolling when the sum value becomes greater than or equal to the first threshold and compares the lateral acceleration indicative signal value with a second threshold for detecting termination of vehicular rolling when the lateral acceleration indicative signal value becomes smaller than the second threshold.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIGS. 4(A) through 4(C) are charts showing variation of lateral acceleration Yg, variation rate of lateral acceleration $\Delta Yg$ and a rolling magnitude representative data R ($Yg + \Delta Yg$).

DESCRIPTION OF THE PREFERRED EMBODIMENT

Figure 1:
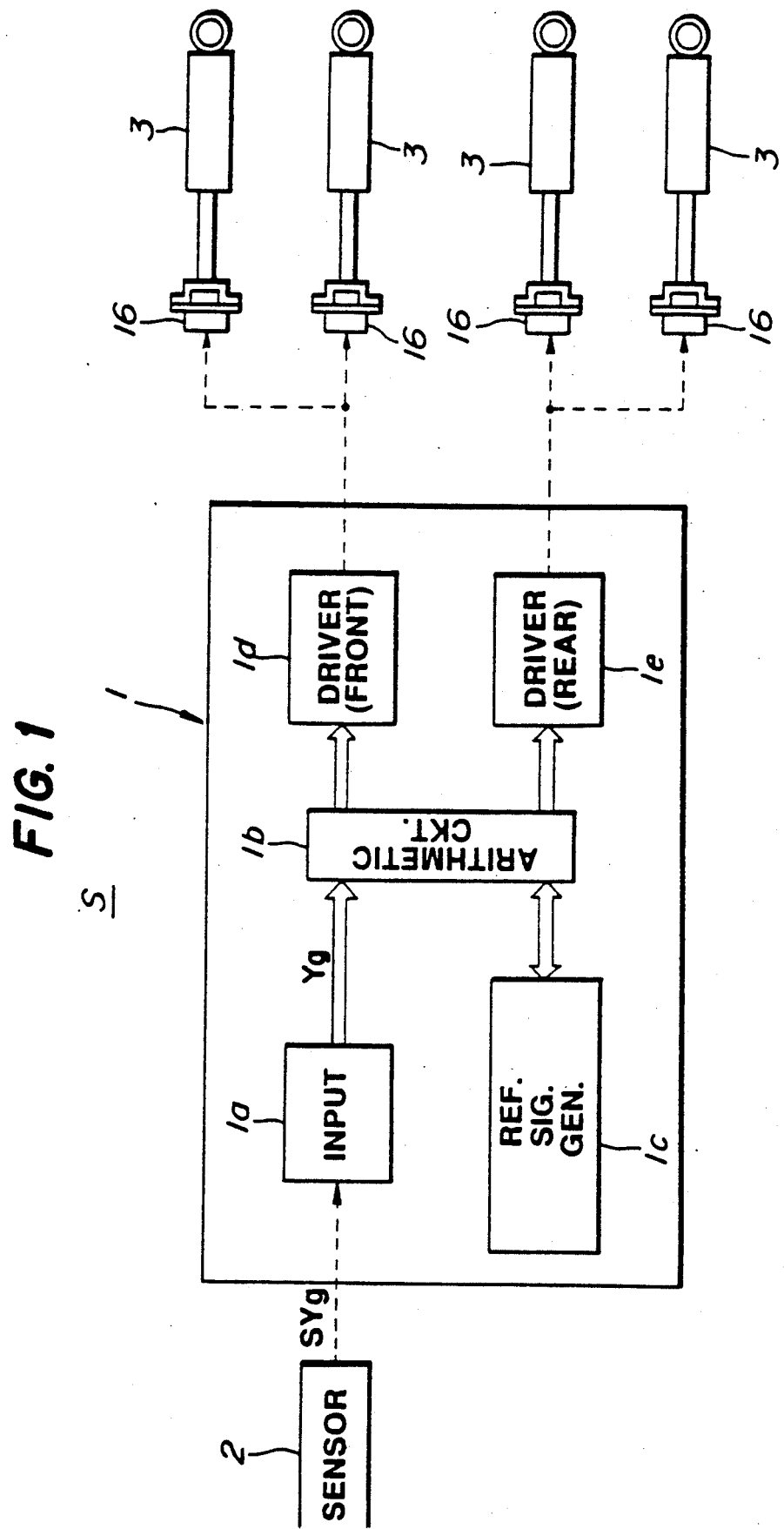
FIG. 1 is a schematic block diagram of the preferred embodiment of the suspension control system according to the invention.
Figure 2:
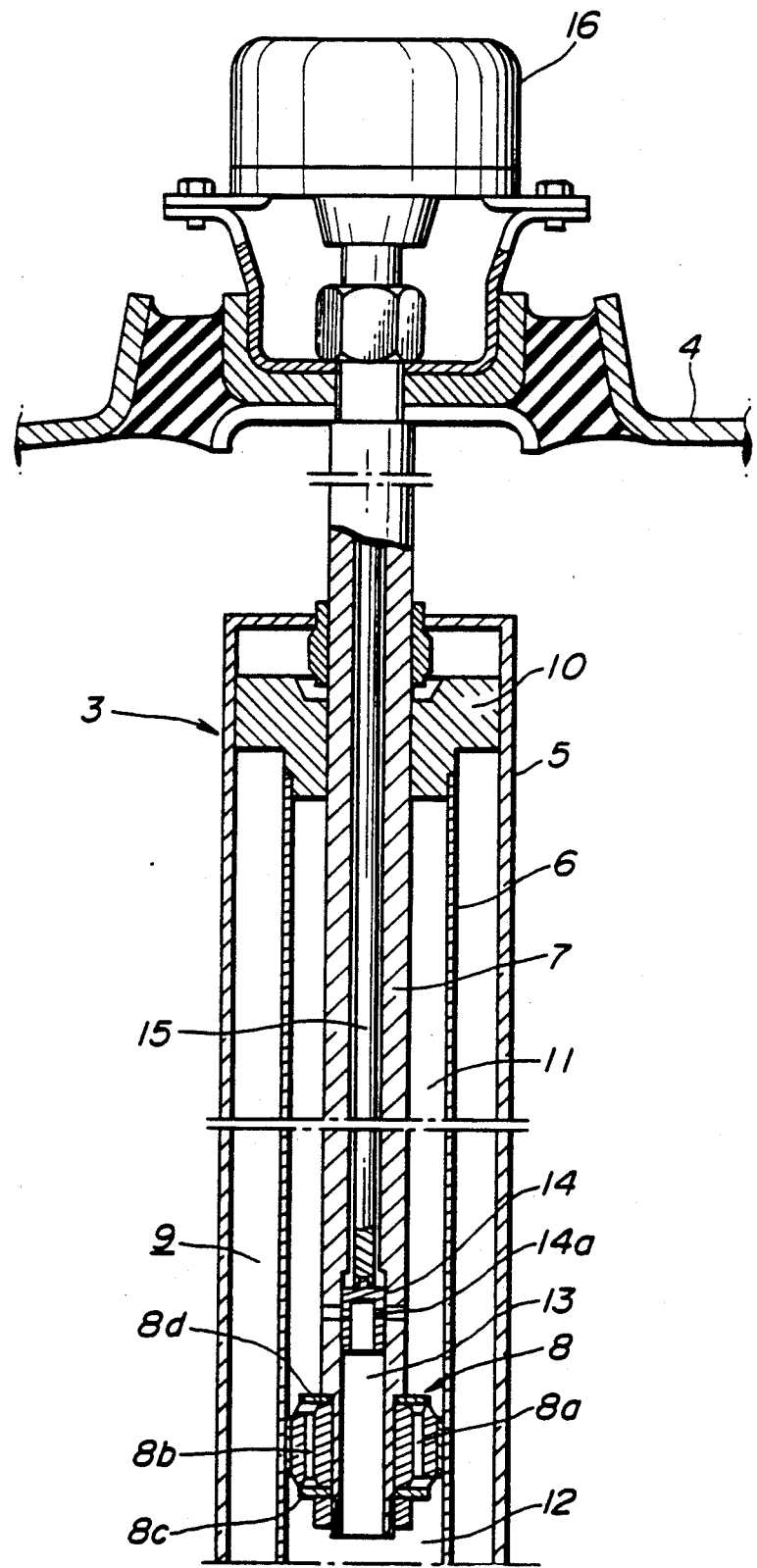
FIG. 2 is a section of a shock absorber which has variable damping characteristics and can be employed in the shown embodiment of a suspension control system FIG. 1.

Referring now to the drawings, particularly to FIGS. 1 and 2, the preferred embodiment of a suspension control system S, according to the present invention employs a microprocessor based control unit 1 for performing control of suspension characteristics. The control unit 1 is connected to a lateral acceleration sensor 2 which monitors lateral acceleration exerted on a vehicle body to produce a lateral acceleration indicative signal $S_{Yg}$. The control unit 1 has an input unit 1a which includes an analog-to-digital converter (A/D converter) for converting the analog form lateral acceleration indicative signal into a digital form lateral acceleration indicative data Yg. The control unit 1 also has a driver circuits 1d and 1e respectively connected to actuators 16 of front-left, front-right, rear-left and rear-right suspension systems. In the shown embodiment, respective suspension systems include a variable damping characteristics shock absorber 3 for adjusting suspension characteristics.

As seen from FIG. 2, the variable damping force shock absorber 3 has an outer cylinder 5 and an inner cylinder coaxially arranged in the outer cylinder 5. A piston 8 is slidingly disposed within the inner cylinder 6 for dividing the interior space of the inner cylinder into upper and lower fluid chambers 11 and 12. The piston 8 is secured onto the lower end of a piston rod 7 for movement in bounding and rebounding directions according to relative bounding and rebounding motions of the vehicle body and associated suspension member rotatably supporting associated one of the road wheels. Though FIG. 2 does not show the structure, a bottom valve assembly is fitted to the lower end of the inner cylinder 6 for restricting fluid communication between the lower fluid chamber 12 and a reservoir chamber 9 defined between the inner and outer cylinders 6 and 5. On the other hand, a rod guide 10 is fitted to the top end of the inner cylinder 6 for sealingly closing the top end of the inner cylinder and slidingly guiding the piston rod 7.

The piston 8 is formed with axially extending through openings 8a and 8b which are respectively designed for establishing fluid communication between the upper and lower fluid chambers 11 and 12. The lower end of the opening 8b is closed by means of a lower flow restriction valve 8c which blocks fluid flow from the lower fluid chamber 12 to the upper fluid chamber 11 in piston rebounding (expansion) motion and resiliently restricts fluid flow from the upper fluid chamber 11 to the lower fluid chamber 12 in the piston bounding (compression) stroke. On the other hand, the upper end of the opening 8a is closed by means of an upper flow restriction valve 8d which blocks fluid flow from the upper chamber 11 to the lower fluid chamber 12 during the piston bounding stroke and resiliently restricts fluid flow from the lower fluid chamber to the upper fluid chamber during the piston rebounding stroke.

In addition, one or more radially extending through openings 7a are formed through the piston rod 7. The radially extending through openings 7a have an inner end communicated with an axial opening 13 defined though the piston rod 7. A rotary valve member 14 with a plurality of mutually different diameters of fluid flow orifices 14a are formed therethrough. One of the plurality of the fluid flow orifices 14a is placed in alignment with the radially extending through openings 7a for generating a damping force due to flow restriction therethrough. The rotary valve member 14 is connected to the actuator 16 which comprises a step motor, via an actuation rod 15.

With the shown construction set forth above, the shock absorber 3 has variable of damping characteristics and thereby adjusts suspension characteristics of the associated suspension system. Of course, the damping characteristics of the shown shock absorber 3 may be variable at a plurality of stiffness or hardness levels. However, in order to simplify the disclosure and for facilitating a better understanding of the invention, the following discussion will be given with respect to a two-way mode variation of the damping characteristics between a HARD mode and SOFT mode. Therefore, the rotary valve member 14 has a variable angular position between a HARD mode position and a SOFT mode position for establishing harder and softer damping characteristics of the shock absorber 3.

Returning to FIG. 1, the control unit 1 has an arithmetic circuit 1b for performing arithmetic operations and for producing a suspension control signal to be delivered to the front and rear driver circuits 1d and 1e. The arithmetic circuit 1b is connected to a reference signal generator circuit 1c which stores reference signals and is designed for generating reference signals to be supplied to the arithmetic circuit 1b, together with the lateral acceleration indicative data Yg.

Figure 3:
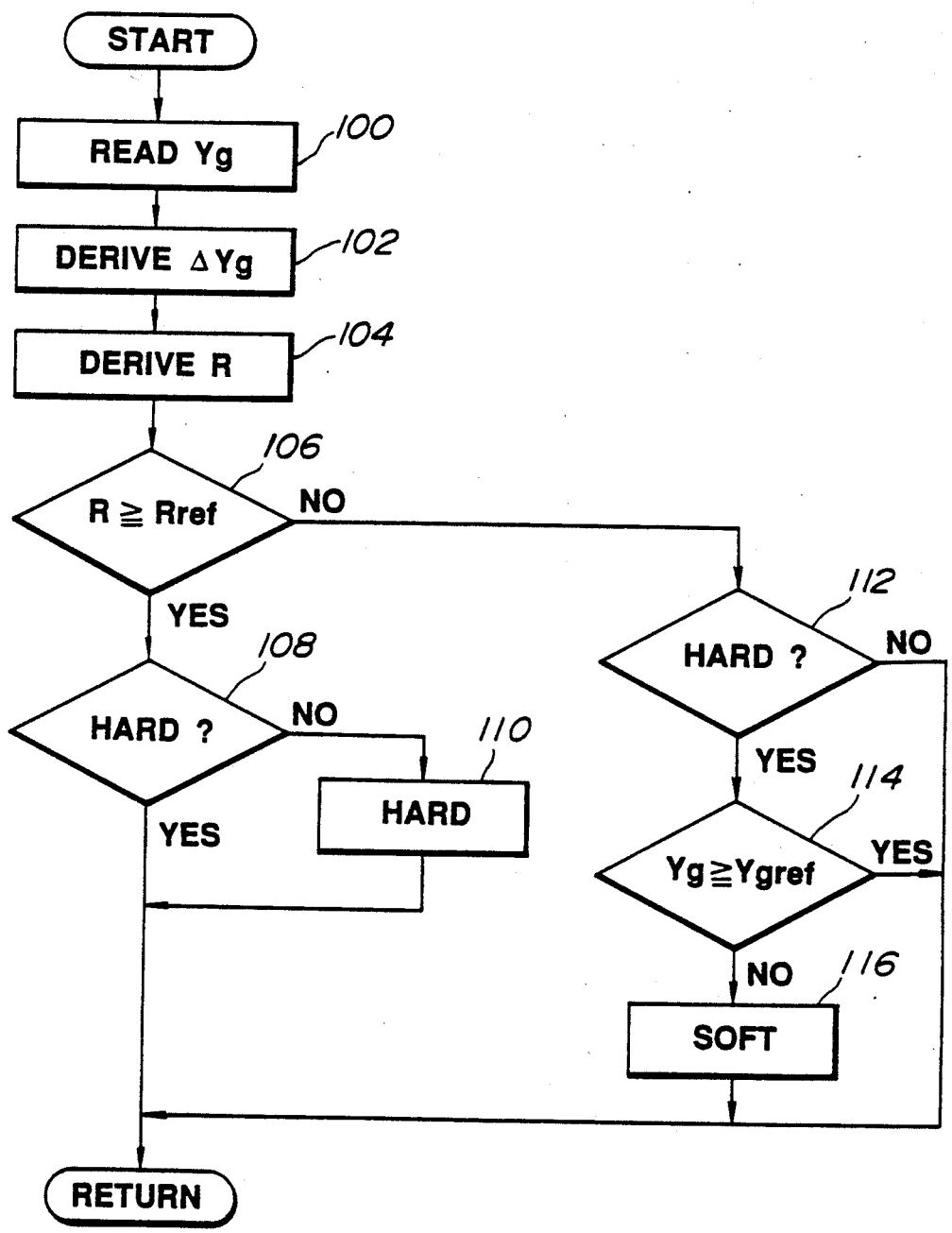
FIG. 3 is a flowchart of a suspension control routine to be executed by a control unit in the preferred embodiment of the suspension control system of FIG. 2.

Operation of the shown embodiment of the suspension control system of FIGS. 1 and 2 will be discussed herebelow with reference to FIG. 3. A flowchart shown in FIG. 3 illustrates a process of lateral acceleration dependent roll suppressive suspension control routine to be executed by the control unit 1. The shown routine may be triggered at each predetermined timing, e.g. every 20 ms for adjusting the suspension characteristics.

Immediately after starting execution, the lateral acceleration indicative data Yg is read out at a step 100. Then, the read lateral acceleration indicative signal Yg is differentiated to derive a variation rate $\Delta Yg$ at a step 102. Thereafter, a rolling magnitude representative data R is derived at a step 104 by deriving a sum value of the lateral acceleration indicative data Yg and the variation rate $\Delta Yg$ of the lateral acceleration.

At a step 106, the derived rolling magnitude representative data R is compared with a predetermined rolling threshold $R_{ref}$. If the rolling magnitude representative data R is greater than or equal to the rolling reference, the operational mode of the shock absorber 3 is checked whether the suspension system is in a HARD mode or not, at a step 108. If the operational mode of the shock absorber is in a HARD mode, the process directly goes to an END. On the other hand, if the shock absorber operational mode is in a SOFT mode as checked at the step 108, then, a suspension control signal ordering a HARD mode is output to the front and rear driver circuits 1d and 1e at a step 110. In response to the suspension control signal ordering the HARD mode of operation of the shock absorber, the driver circuits 1d and 1e output drive signals for the actuators 16 for driving the latter to place the rotary valve member 14 at the HARD mode position, at a step 112. After setting the shock absorber 3 at the HARD mode, the process goes to the END.

On the other hand, if the rolling magnitude indicative data R is smaller than the rolling threshold $R_{ref}$, then process goes to a step 112. In the step 112, the operational mode of the shock absorber 3 is checked whether the shock absorber is in the HARD mode. If the shock absorber operational mode as checked at the step 112 is in the SOFT mode and thus the answer in the step 112 is negative, then the process goes to the END. On the other hand, when the shock absorber 3 is in the HARD mode and thus the answer at the step 112 is positive, then, the lateral acceleration Yg is compared with a predetermined lateral acceleration threshold $Yg_{ref}$ at a step 114. When the lateral acceleration indicative data Yg is greater than or equal to the lateral acceleration threshold $Yg_{ref}$ as checked at the step 114, the process directly goes to the END. Therefore, at this time, the operational mode is maintained at the HARD mode and unchanged. On the other hand, if the lateral acceleration indicative data Yg is smaller than the lateral acceleration threshold $Yg_{ref}$ as checked at the step 114, an elapsed time is measured and the suspension control signal ordering a SOFT mode of the shock absorber is output after expiration of the predetermined period of time, at a step 116. After setting the operational mode to the SOFT mode, the process goes to the END.

In the shown process, since the shown embodiment employs the rolling magnitude representative data R ($Yg+\Delta Yg$), higher response characteristics can be obtained. This becomes clear from FIGS. 4(A) through 4(C). Namely, when the lateral acceleration Yg (FIG. 4(A)) is used as a rolling representative parameter, vehicular rolling is detected when the magnitude of lateral acceleration Yg exceeds a predetermined threshold a with a lag time $t_1$ from starting of rolling motion. Similarly, when the variation rate $\Delta Yg$ of the lateral acceleration is used as the rolling representative parameter, vehicular rolling is detected when the variation rate $\Delta Yg$ exceeds a predetermined threshold b with a lag time $t_2$ from starting of rolling motion.

In comparison to these, when the sum value R of the lateral acceleration Yg and the variation rate $\Delta Yg$ of the lateral acceleration is used according to the present invention, the sum value R exceeds a threshold valve c with a lag time $t_3$ from starting of rolling motion. As is apparent from FIGS. 4(A) through 4(C), by utilizing the sum value R, the lag time becomes much shorter than that of using the lateral acceleration or the variation rate of the lateral acceleration. Therefore, much higher response characteristics can be obtained in rolling suppressive suspension control.

In addition, according to the shown embodiment, since the end of rolling motion is detected solely based on the lateral acceleration, the suspension characteristics can be maintained at the HARD mode throughout the cornering and thus assure driving stability. Furthermore, since the shown process provides a predetermined delay time from detection of the vehicular condition for softening suspension characteristics, hunting in the switching of suspension characteristics can be successfully avoided.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the shown embodiment is directed to a suspension control employing a variable damping force shock absorber, the present invention may also be applicable for a suspension system with a variable pressure pneumatic spring, active suspension systems, and so forth.

What is claimed is:

1. A suspension control system for an automotive vehicle, comprising:
   a suspension system provided between a vehicle body and a suspension member rotatably supporting a road wheel, said suspension system incorporating means for varying suspension characteristics between at least a first mode with a softer suspension characteristic and a second mode with a harder suspension characteristic;
   a lateral acceleration sensor for monitoring lateral acceleration exerted on the vehicle body to produce a lateral acceleration indicative signal; and
   a control unit receiving said lateral acceleration indicative signal for deriving a variation rate of lateral acceleration on the basis thereof, deriving a sum value of said lateral acceleration and said variation rate of lateral acceleration, and comparing said sum value with a predetermined first threshold value for detecting when said sum value is greater than or equal to said first threshold value in order to produce a suspension control signal for ordering said second mode of said suspension system.

2. A suspension control system as set forth in claim 1, wherein said control unit compares said lateral acceleration indicative signal value with a predetermined threshold while said suspension system is maintained in said second mode, for detecting a magnitude of lateral acceleration smaller than said second threshold for producing a suspension control signal ordering said first mode of said suspension system.

3. A suspension control system as set forth in claim 2, wherein said control unit produces said suspension control signal ordering said first mode after a predetermined period from detection of the magnitude of lateral acceleration smaller than said second threshold.

4. A suspension control system for an automotive vehicle, comprising:
   a suspension system provided between a vehicle body and a suspension member rotatably supporting a road wheel, said suspension system incorporating means for varying suspension characteristics between at least a first mode with a softer suspension characteristic and a second mode with a harder suspension characteristic;

a lateral acceleration sensor for monitoring lateral acceleration exerted on the vehicle body to produce a lateral acceleration indicative signal; and a control unit receiving said lateral acceleration indicative signal for deriving a variation rate of lateral acceleration on the basis thereof, and deriving a sum value of said lateral acceleration and said variation rate of lateral acceleration, said control unit detecting initiation of vehicular rolling on the basis of said sum value for producing a first suspension control signal ordering said second mode and detecting termination of vehicular rolling on the basis of magnitude of lateral acceleration for producing a second suspension control signal ordering said first mode.

5. A suspension control system as set forth in claim 4, wherein said control unit produces said second suspension control signal after a predetermined period from detection of termination of vehicular rolling.

6. A suspension control system as set forth in claim 5, wherein said control unit compares said sum value with a first threshold for detecting initiation of vehicular rolling when said sum value becomes greater than or equal to said first threshold and compares said lateral acceleration indicative signal value with a second threshold for detecting termination of vehicular rolling when said lateral acceleration indicative signal value becomes smaller than said second threshold.

7. A suspension control system for an automotive vehicle, comprising:

a suspension system provided between a vehicle body and a suspension member rotatably supporting a road wheel, said suspension system incorporating means for varying suspension characteristics between at least a first mode with a softer suspension characteristic and a second mode with a harder suspension characteristic;

a lateral acceleration sensor for monitoring lateral acceleration exerted on the vehicle body to produce a lateral acceleration indicative signal; and a control unit receiving said lateral acceleration indicative signal for deriving a variation rate of lateral acceleration on the basis thereof, deriving a sum value of said lateral acceleration and said variation rate of lateral acceleration, comparing said sum value with a predetermined first threshold value for detecting said sum value greater than or equal to said first threshold value in order to initiate anti-rolling suspension control, wherein said controller compares said lateral acceleration indicative signal value with a second threshold value, while anti-rolling suspension control is active, for detecting said lateral acceleration indicative signal value smaller than or equal to said second threshold value for terminating anti-rolling suspension control.

8. A system for detecting rolling of an automotive vehicle for anti-rolling suspension control, comprising:

a lateral acceleration sensor provided on the vehicular body for monitoring lateral acceleration exerted on the vehicle body to produce a lateral acceleration indicative signal; and means for processing said lateral acceleration indicative signal for deriving a variation rate of lateral acceleration on the basis thereof, deriving a sum value of said lateral acceleration and said variation rate of lateral acceleration, comparing said sum value with a predetermined first threshold value for detecting said sum value greater than or equal to said first threshold value to detect initiation of unacceptable vehicular rolling, and comparing said lateral acceleration indicative signal value with a second threshold value for detecting said lateral acceleration indicative signal value smaller than or equal to said second threshold value for detecting termination unacceptable rolling.

* * * * *